(12) United States Patent
Hutchinson et al.

(10) Patent No.: US 8,259,415 B2
(45) Date of Patent: Sep. 4, 2012

(54) SLIDER BOND PAD WITH A RECESSED CHANNEL

(75) Inventors: Erik Jon Hutchinson, Eden Prairie, MN (US); Christopher Michael Unger, St. Louis Park, MN (US)

(73) Assignee: Seagate Technology LLC, Cupertino, CA (US)

( * ) Notice: Subject to any disclaimer, the term of this patent is extended or adjusted under 35 U.S.C. 154(b) by 373 days.

(21) Appl. No.: 12/489,176

(22) Filed: Jun. 22, 2009

(65) Prior Publication Data

US 2010/0321829 A1 Dec. 23, 2010

(51) Int. Cl.
*G11B 5/48* (2006.01)
(52) U.S. Cl. .................................... 360/234.5
(58) Field of Classification Search ............... 360/234.5, 360/245.8–245.9
See application file for complete search history.

(56) References Cited

U.S. PATENT DOCUMENTS

| | | | |
|---|---|---|---|
| 5,373,111 A | 12/1994 | McClure et al. | |
| 5,451,722 A | 9/1995 | Gregoire | |
| 5,636,104 A | 6/1997 | Oh | |
| 5,686,762 A | 11/1997 | Langley | |
| 6,025,988 A | 2/2000 | Yan | |
| 6,245,445 B1 | 6/2001 | Lykins, II | |
| 6,531,384 B1 | 3/2003 | Kobayashi et al. | |
| 6,720,658 B2 | 4/2004 | Anand | |
| 7,015,580 B2 | 3/2006 | Fitzsimmons et al. | |
| 7,205,661 B2 | 4/2007 | Wark et al. | |
| 7,446,399 B1 | 11/2008 | Li | |
| 7,619,856 B2 * | 11/2009 | Matsumoto et al. | 360/234.5 |

FOREIGN PATENT DOCUMENTS

JP 57188315 11/1982

* cited by examiner

*Primary Examiner* — Allen Heinz
(74) *Attorney, Agent, or Firm* — Fredrikson & Byron, P.A.

(57) ABSTRACT

A slider includes a slider body and a bond pad. The bond pad is positioned on the slider body and has a bonding surface with a recessed channel for directing solder flow. Separately related, an assembly includes a suspension assembly including a suspension mounting surface and a suspension pad on the suspension mounting surface. A slider is positioned adjacent the suspension mounting surface, with a slider pad aligned with the suspension pad. A recessed channel is in at least one of the slider pad or the suspension pad. A solder joint is formed between the suspension pad and the slider pad and extends into the recessed channel.

13 Claims, 8 Drawing Sheets

SLIDER BOND PAD WITH A RECESSED CHANNEL

BACKGROUND

HDDs typically comprise one or more discs. A transducing head carried by a slider is used to read from and write to a data track on a disc. The slider is carried by an arm assembly that includes an actuator arm and a suspension assembly, which can include a separate gimbal structure or can integrally form a gimbal. The slider typically includes slider bond pads connected to suspension bond pads on the suspension assembly through a thermal interconnect (TIC) process. In the TIC process, molten solder is applied between the slider bond pad and the suspension bond pad and subsequently cooled to form a connection.

Since the advent of the HDD, the form factor (size and shape) of sliders has been steadily decreasing. There has also been a trend to increase the number of bond pads for additional electrical connections to the slider. Consequently, size of bond pads as well as space between bond pads has also been decreasing. As these sizes get smaller, the chance of solder from one pair of bond pads (one slider pad and a corresponding suspension pad) undesirably bridging to an adjacent pair of bond pads (another slider pad and corresponding suspension pad) increases. In order to combat the bridging problem, it is possible to reduce the amount of solder used for each solder connection. However, reducing amount of solder used can introduce a new problem of decreasing the mechanical strength of each solder bond.

SUMMARY

According to the present invention, a slider includes a slider body and a bond pad. The bond pad is positioned on the slider body and has a bonding surface with a recessed channel for directing solder flow.

Another embodiment includes a method for electrically connecting a first bond pad to a second bond pad. The method includes placing liquid solder between the first bond pad and the second bond pad, directing solder flow with a recessed channel in the first bond pad, and solidifying the solder to form a bond between the first bond pad and the second bond pad such that the first bond pad is aligned substantially perpendicular to the second bond pad.

DETAILED DESCRIPTION

Figure 1:
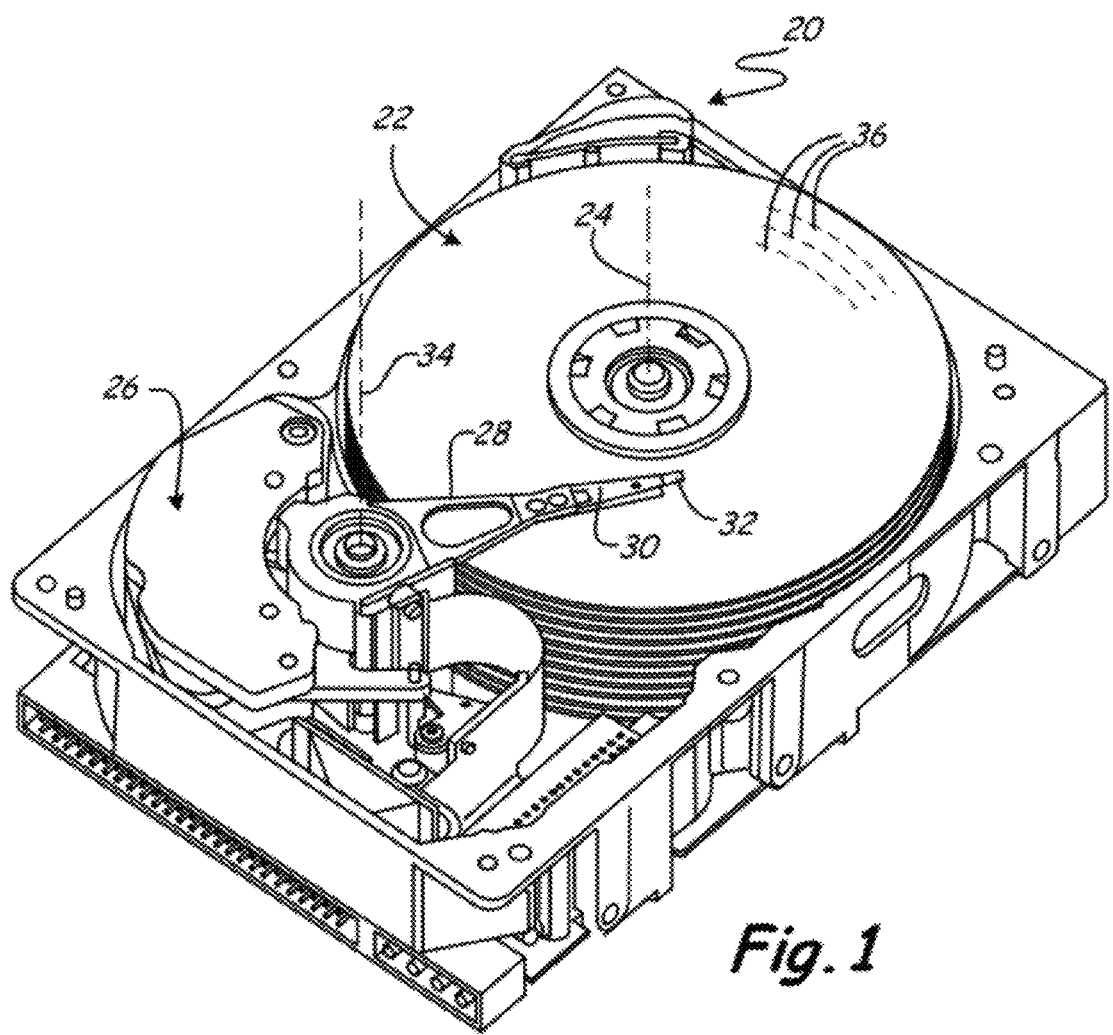
FIG. 1 is a perspective view of an exemplary hard disc drive HDD system.
Figure 2:
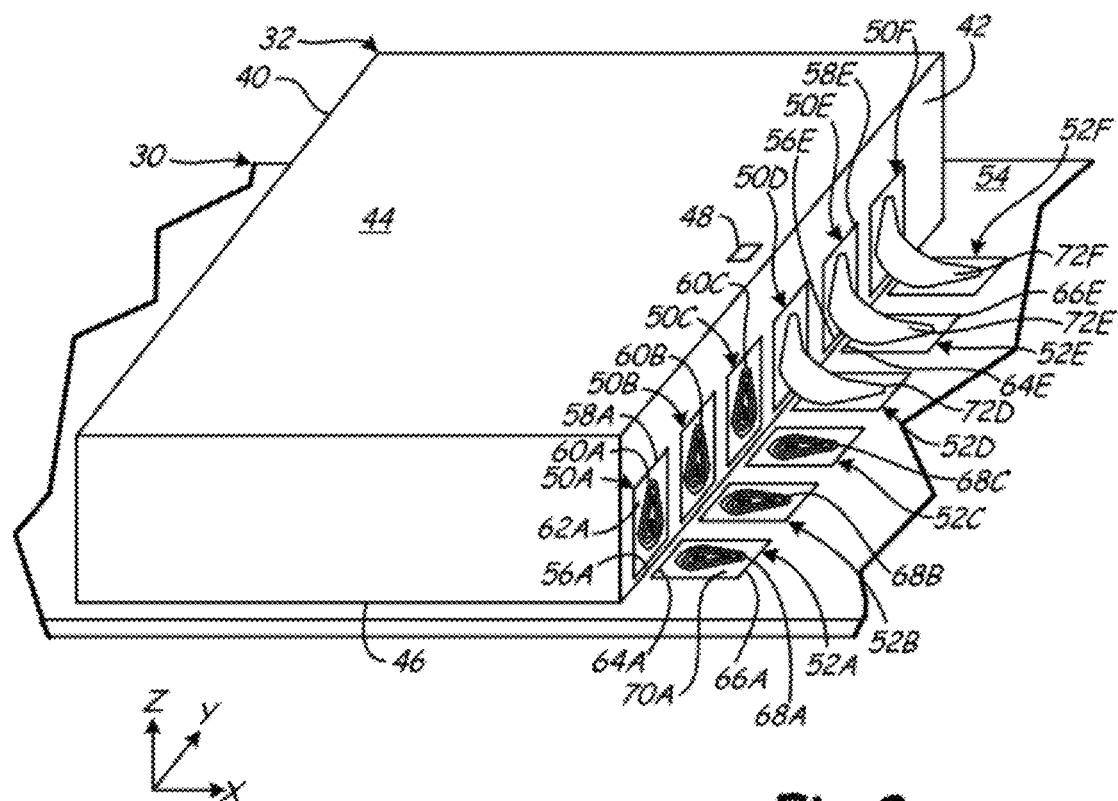
FIG. 2 is a perspective view of a slider and suspension assembly of the present invention.

FIG. 1 is a perspective view of an exemplary hard disc drive (HDD) system 20 that includes magnetic storage disc 22 configured to rotate about axis 24, actuation motor 26 (e.g., a voice coil motor), actuator arm 28, suspension assembly 30, and slider 32 carrying a transducing head (shown in FIG. 2). Slider 32 is supported by suspension assembly 30, which in turn is supported by actuator arm 28. Actuation motor 26 is configured to pivot actuator arm 28 about axis 34, in order to sweep suspension 30 and slider 32 in an arc across a surface of rotating disc 22 with slider 32 "sliding" or "flying" across disc 22 on a cushion or air. The transducing head carried by slider 32 can be positioned relative to selected concentric data tracks 36 of disc 22, for reading from and writing to disc 22. It should be noted that a stack of co-rotating discs 22 can be provided, with additional actuator arms 28, suspension assemblies 30, and sliders 32 carrying transducing heads for reading and writing at top and bottom surfaces of each disc 22 in the stack.

FIG. 2 is a perspective view of slider 32 connected to suspension assembly 30. Slider 32 includes leading edge 40 opposite of trailing edge 42, and air bearing surface 44 opposite of suspension facing surface 46. Transducing head 48 is positioned on air bearing surface 44 near trailing edge 42. Slider pads 50A-50F are solder bond pads positioned on trailing edge 42 near suspension facing surface 46. Suspension assembly 30 includes suspension pads 52A-52F, which are solder bond pads positioned on suspension mounting surface 54, near trailing edge 42 of slider 32. Slider pads 50A-50F are aligned with and substantially perpendicular to suspension pads 52A-52F, respectively. Leading edge 42 is also substantially perpendicular to suspension mounting surface 54. Slider pads 50A-50F are substantially similar to each other in shape, size, and orientation but differ from each other in their position on leading edge 42. Similarly, suspension pads 52A-52F are substantially similar to each other in shape, size, and orientation but differ from each other in their position on suspension mounting surface 54.

Slider pad 50A has first edge 56A positioned nearest suspension mounting surface 54 and second edge 58A positioned opposite, nearest air bearing surface 44. Slider pad 50A has recessed channels 60A on bonding surface 62A. Recessed channels 60A have a teardrop shape, wide at one end and narrow at the other. Thus, a greater portion of recessed channels 60A is nearer first edge 56A than second edge 58A. Slider pads 50B-50F have similar recessed channels 60B-60F respectively (shown on FIG. 4C for slider pads 50D-50F).

Suspension pad 52A has first edge 64A positioned nearest slider pad 50A and second edge 66A positioned away from slider pad 50A. Suspension pad 52A has recessed channels 68A on bonding surface 70A. Recessed channels 68A also have a teardrop shape, wide at one end and narrow at the other. Thus, a greater portion of recessed channels 68A is nearer first edge 64A than second edge 66A. Suspension pads 52B-52F have similar recessed channels 68B-68F respectively (not shown for suspension pads 52D-52F).

In an alternative embodiment, suspension pads 52A-52F can have a relatively smooth bonding surface, without any recessed channels 68A-68F. Slider pads 50A-50F would still have recessed channels 60A-60F. In another alternative embodiment, slider pads 50A-50F could be relatively smooth and only suspension pads suspension pads 52A-52F would have recessed channels 68A-68F. In still other embodiments, slider pads 50A-50F and slider pads 50A-50F could have any combination of smooth surfaces and recessed channels so long as at least one slider or suspension pad has at least one recessed channel.

Solder joints 72D-72F connect slider pads 50D-50F to suspension pads 52D-52F, respectively. Solder joints connecting slider pads 50A-50C to suspension pads 52A-52C, respectively, are omitted from FIG. 2 to better illustrate recessed channels 60A-60C and 68A-68C. All pad pairs do, however, have solder connections shaped by their respective recessed channels. For example, slider pad 50E has a teardrop shaped recessed channels 60E (shown in FIG. 4E) that causes a large, wide portion of solder joint 72E to be positioned near first edge 56E and a small, narrow portion of solder joint 72E to be positioned near second edge 58E. When solder joint 72E is solid, it extends into recessed channels 60E. When solder joint 72E is molten, recessed channels 60E direct solder flow along paths defined by recessed channels 60E. Recessed channels 60E direct solder flow back toward second edge 58E and away from nearby slider pads 50D and 50F as solder flows to the narrow portion of the teardrop shaped recessed channels 60E. Because the greatest and widest portion of recessed channels 60E is near first edge 56E, a greater quantity of solder flows into recessed channels 60E near first edge 56E. Thus, solder joint 72E is elongated but with most of its solder near first edge 56E. Force for moving the solder flow comes from surface tension, capillary action, and a thermal interconnect (TIC) bonding process.

Figure 3:
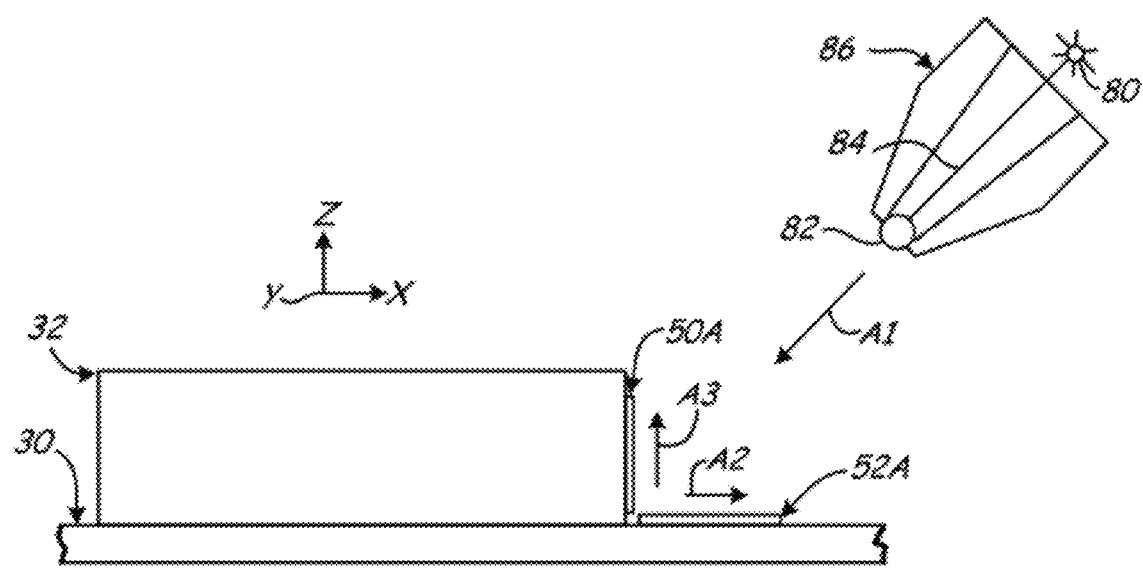
FIG. 3 is a side elevation view of the slider and suspension assembly of FIG. 2 in a thermal interconnect bonding process.

FIG. 3 is a side elevation view of slider 32 and suspension assembly 30 in a TIC bonding process. In one TIC process, beam 84 from laser 80 heats and melts solder ball 82. Capillary nozzle 86 is pressurized with nitrogen to propel molten solder ball 82 toward a corner intersection between slider pad 50A and suspension pad 52A as illustrated by arrow A1. Molten solder ball 82 strikes each of slider pad 50A and suspension pad 52A at approximately 45 degree angles, and ricochets (also called kickback) in directions such as those illustrated by arrow A2 and A3. Flow of ricocheting solder ball 82 is pushed back and directed along flow paths defined by recessed channels 60A and 68A (shown in FIG. 2). In other embodiments, solder ball 82 could strike slider pad 50A and suspension pad 52A at virtually any angle between about 35 degrees and about 55 degrees. If recessed channels 60A and 68A have patterns different from those illustrated in FIG. 2, solder flow can be directed along slider pad 50A and suspension pad 52A in a different manner.

Figure 4A:
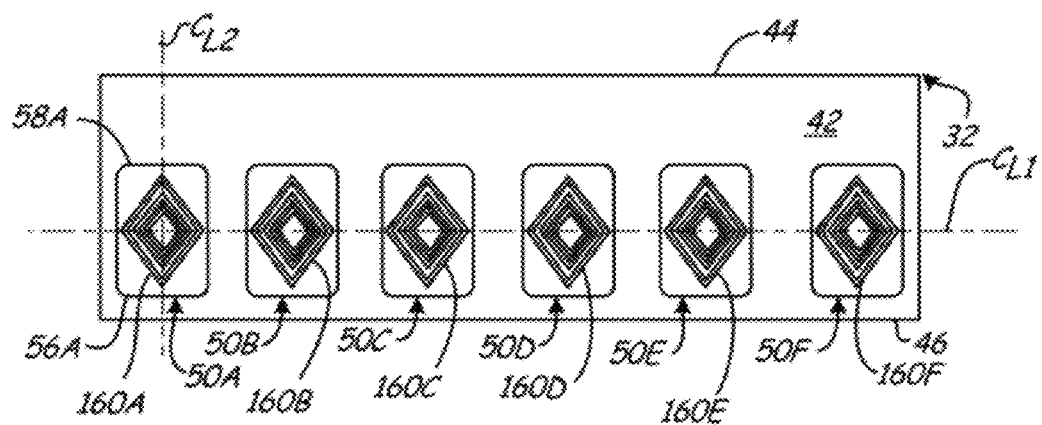
FIGS. 4A-4G are end elevation views of the slider of FIG. 2, having slider pads with various embodiments of recessed channels.

FIGS. 4A-4G show an end elevation view of trailing edge 42 of slider 32, having slider pads 50A-50F. FIGS. 4A-4E & 4G show channels having a plurality of divisions therein created by upstanding walls of the channels such as shown in FIG. 6D (cross-section of FIG. 4E). FIG. 4A is one embodiment of recessed channels 160A-160F wherein first centerline axis $C_{L1}$ is substantially parallel to each of air bearing surface 44, first edge 56A, and second edge 58A. When mounted on suspension assembly 30 (shown in FIG. 2), first centerline axis $C_{L1}$ is also substantially parallel to suspension pads 52A-52F (shown in FIG. 2). First centerline axis $C_{L1}$ divides slider pad 50A into a proximal half near suspension pad 52A and a distal half away from the first suspension pad 52A. Second centerline axis $C_{L2}$ is substantially perpendicular to first centerline axis $C_{L1}$.

Recessed channels 160A have a diamond shape. The diamond shape is essentially that of three concentric rhombuses with sides intersecting along first and second centerline axes $C_{L1}$, and $C_{L2}$. The diamond shape is substantially symmetric about each of first and second centerline axes $C_{L1}$, and $C_{L2}$. The diamond shape directs solder flow near the edges of slider pad 50A but not over those edges to adjacent slider pad 50B. The diamond shape tends to direct a greater quantity of solder to a center of slider pad 50A.

Figure 4B:
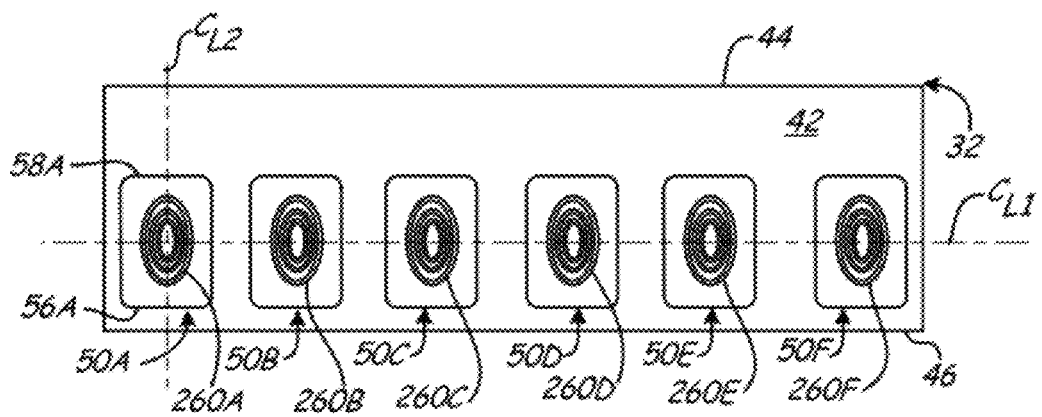

FIG. 4B is an end elevation view of trailing edge 42 of slider 32, having slider pads 50A-50E with another embodiment of recessed channels 260A-260E. Recessed channels 260A-260E are similar to recessed channels 160A-160E except for a different shape pattern.

Recessed channels 260A have an oval shape. The oval shape is essentially that of three concentric elongated circles. The oval shape is substantially symmetric about each of first and second centerline axes $C_{L1}$, and $C_{L2}$. The oval shape directs solder flow near the edges of slider pad 50A but not over those edges to adjacent slider pad 50B. The oval shape tends to direct a greater quantity of solder to a center of slider pad 50A, much like that of the diamond shape of FIG. 4A. However, the oval shape tends to create a solder joint more narrow and elongated along second centerline axis $C_{L2}$ than that created by the diamond shape.

Figure 4C:
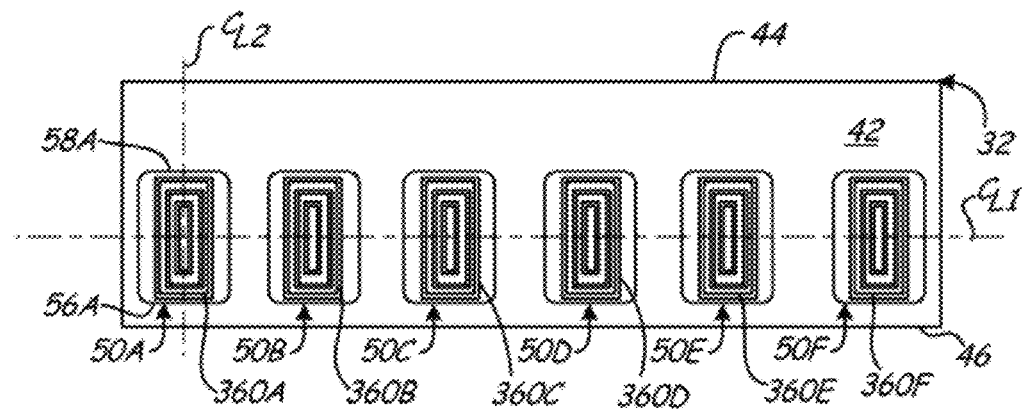

FIG. 4C is an end elevation view of trailing edge 42 of slider 32, having slider pads 50A-50E with another embodiment of recessed channels 360A-360E. Recessed channels 360A-360E are similar to recessed channels 160A-160E except for a different shape pattern.

Recessed channels 360A have a rectangular shape. The rectangular shape is essentially that of three concentric elongated rectangles. The rectangle shape is substantially symmetric about each of first and second centerline axes $C_{L1}$, and $C_{L2}$. The rectangle shape directs solder flow near the edges of slider pad 50A but not over those edges to adjacent slider pad 50B. The rectangle shape tends to direct a greater quantity of solder to a center of slider pad 50A, much like that of the diamond shape of FIG. 4A and the oval shape of FIG. 4B. However, the rectangular shape tends to create a solder joint more elongated along second centerline axis $C_{L2}$ than that created by either the diamond shape or the oval shape. Moreover, the rectangular shape can also direct solder flow to corners of slider pad 50A to increase bond area.

Figure 4D:
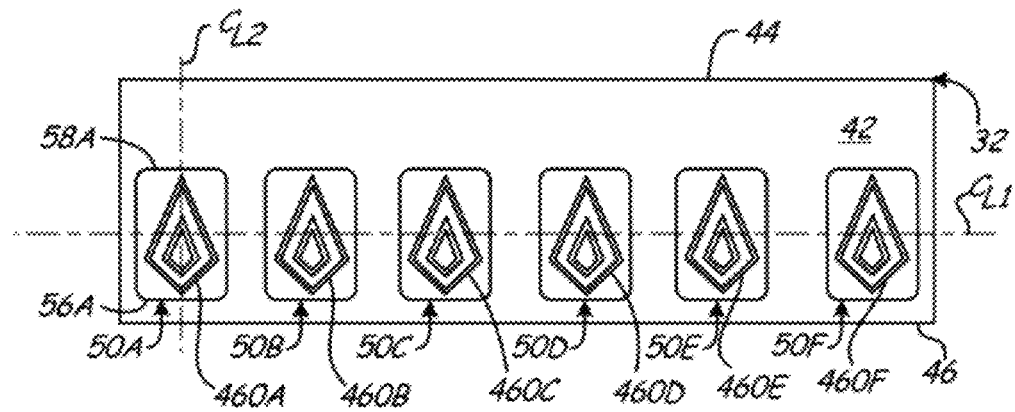

FIG. 4D is an end elevation view of trailing edge 42 of slider 32, having slider pads 50A-50E with another embodiment of recessed channels 460A-460E. Recessed channels 460A-460E are similar to recessed channels 160A-160E except for a different shape pattern.

Recessed channels 460A have a kite shape. The kite shape is essentially that of two concentric four-sided structures. The kite shape is substantially symmetric about second centerline axis $C_{L2}$, but is asymmetric about first centerline axis $C_{L1}$. The kite shape is similar to that of the diamond shape of FIG. 4A except for the asymmetry about first centerline axis $C_{L1}$. A greater portion of the kite shaped recessed channels 460A is nearer first edge 56A than second edge 58A. This causes the kite shape to direct a greater quantity of solder flow toward first edge 56A, and consequently, toward suspension pad 52A (shown in FIG. 2) when mounted. Due to symmetry, an approximately equal quantity of solder is directed into recessed channels 460A on both sides of second centerline axis $C_{L2}$. In another embodiment, a greater portion of the kite shaped recessed channels 460A could be nearer second edge 58A than first edge 56A in order to direct a greater quantity of solder flow toward second edge 58A.

Figure 4E:
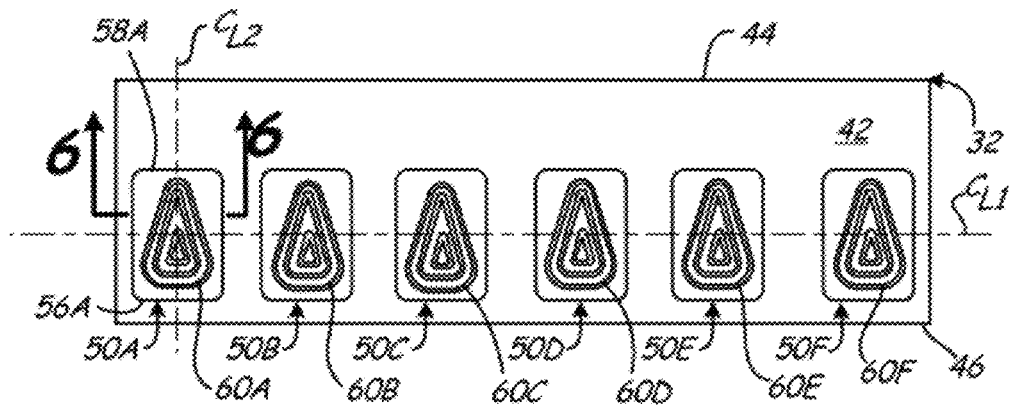

FIG. 4E is an end elevation view of trailing edge 42 of slider 32, having slider pads 50A-50E with the teardrop shaped recessed channels 60A-60E, as described with respect to FIG. 2.

The teardrop shape has three concentric curved structures. The teardrop shape is substantially symmetric about second centerline axis $C_{L2}$, but is asymmetric about first centerline axis $C_{L1}$. The teardrop shape is similar to that of the oval shape of FIG. 4B except for the asymmetry about first centerline axis $C_{L1}$. A greater portion of the teardrop shaped recessed channels 60A is nearer first edge 56A than second edge 58A. This causes the teardrop shape to direct a greater quantity of solder flow toward first edge 56A, and consequently, toward suspension pad 52A (shown in FIG. 2) when mounted. As illustrated in FIG. 4E, the teardrop shape directs more solder near first edge 56A than does the kite shape as illustrated in FIG. 4D. Due to symmetry, an approximately equal quantity of solder is directed into recessed channels 60A on both sides of second centerline axis $C_{L2}$. In another embodiment, a greater portion of the teardrop shaped recessed channels 60A could be nearer second edge 58A than first edge 56A in order to direct a greater quantity of solder flow toward second edge 58A.

Figure 4F:
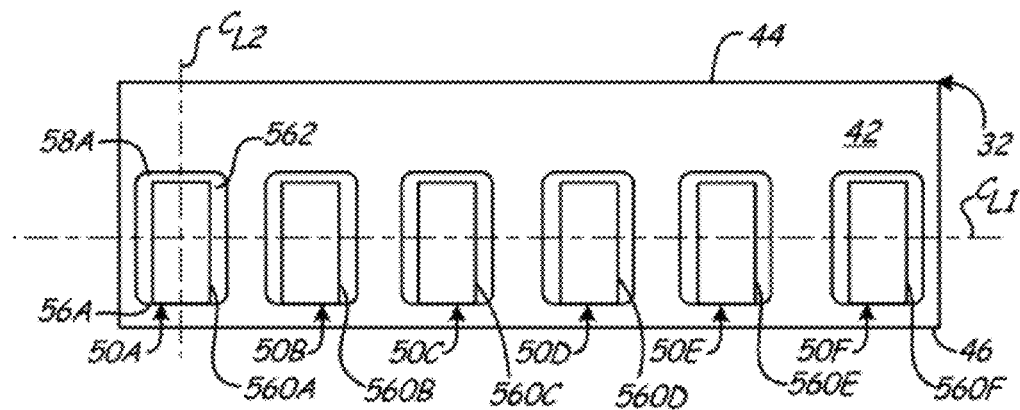

FIG. 4F is an end elevation view of trailing edge 42 of slider 32, having slider pads 50A-50E with another embodiment of recessed channels 560A-560E. Recessed channels 560A-560E are similar to recessed channels 160A-160E except for a different shape pattern.

Recessed channel 560A has a rectangular reservoir shape. The rectangular reservoir shape is a single, wide, recessed channel in slider pad 50A. The rectangular reservoir shape is substantially symmetric about second centerline axis $C_{L2}$, but is asymmetric about first centerline axis $C_{L1}$. The rectangular reservoir shape is similar to that of the rectangular shape of FIG. 4C except for the channel width and the asymmetry about first centerline axis $C_{L1}$. A greater portion of the rectangular reservoir shaped recessed channel 560A is nearer first edge 56A than second edge 58A. Raised portion 562 of slider pad 50A surrounds recessed channel 560A on all sides except for that of first edge 56A. This causes the rectangular reservoir shape to direct a greater quantity of solder flow toward first edge 56A, and consequently, toward suspension pad 52A (shown in FIG. 2) when mounted. Due to symmetry, an approximately equal quantity of solder is directed into recessed channel 560A on both sides of second centerline axis $C_{L2}$. Raised portion 562 can effectively corral solder flow in the area defined by recessed channel 560A, directing solder flow away from adjacent slider pads such as slider pad 50B. Thus, the rectangular reservoir shape is suitable for use with a relatively large volume of solder. In one embodiment, raised portion 562 of slider pad 50A can be about 5 microns wide.

Figure 4G:
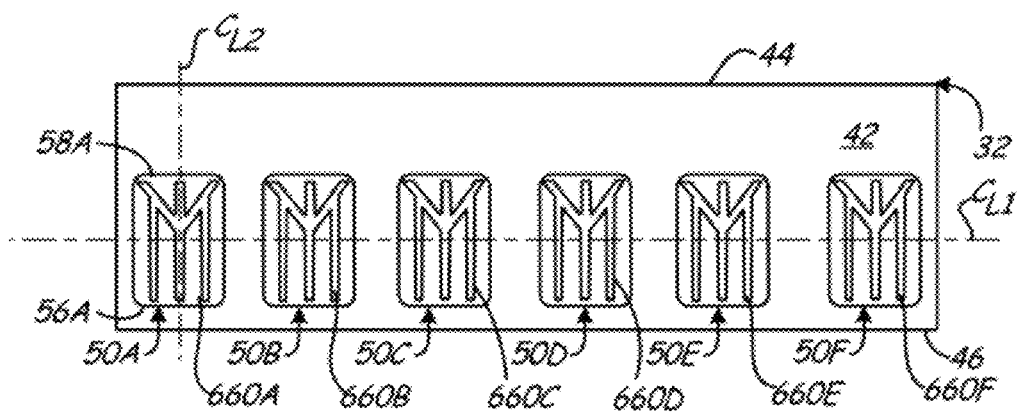

FIG. 4G is an end elevation view of trailing edge 42 of slider 32, having slider pads 50A-50E with another embodiment of recessed channels 660A-660E. Recessed channels 660A-660E are similar to recessed channels 160A-160E except for a different shape pattern.

Recessed channel 660A has a shape of the letters Y, I, and M (without serifs) superimposed on top of each other, and will therefore be referred to herein as a "YIM" shape. The YIM shape is essentially that of three parallel channels connected to each other by two diagonal channels. The three parallel channels are substantially perpendicular to first centerline axis $C_{L1}$. The two diagonal channels are at approximately 45 degree angles to the three parallel channels and at approximately a 90 degree angle to each other. The two diagonal channels extend to corners of slider pad 50A near second edge 58A. The three parallel channels direct solder flow along their lengths, toward first edge 56A and second edge 58A. The three parallel lines tend to elongate the solder joint and discourage solder flow to nearby pads. Because of the two diagonal channels, a greater portion of the YIM shaped recessed channel 660A is nearer second edge 58A than first edge 56A. Thus, recessed channel 660A directs solder flow toward both first and second edges 56A and 58A but directs a greater quantity of solder flow toward second edge 58A without flowing over second edge 58A. The YIM shape is suitable for use with a relatively large volume of solder. Due to symmetry, an approximately equal quantity of solder is directed into recessed channel 660A on both sides of second centerline axis $C_{L2}$.

The recessed channels illustrated with respect to FIGS. 4A-4G can also be used on suspension pads 52A-52F (shown in FIG. 2) in addition to, or instead of, on slider pads 50A-50F. Shapes of recessed channels need not, however, be strictly limited to those illustrated in FIGS. 4A-4G. Instead, the recessed channels illustrated with respect to FIGS. 4A-4G can be varied depending on design parameters. For example, slider pads 50A-50F can have fewer or more recessed channels than those illustrated in FIGS. 4A-4E. Moreover, aspects of one embodiment can be combined with aspects of another embodiment to create a recessed channel suitable for a particular purpose.

Selection of a recessed channel shape for a particular purpose can depend on various factors and design requirements, such as size of slider pads 50A-50F and suspension pads 52A-52F, spacing between slider pads 50A-50F and suspension pads 52A-52F, size of solder ball 82 (shown in FIG. 3), strength requirements for solder joints 72D-72F (shown in FIG. 2), and yield requirements (e.g. what is an acceptable percentage of solder joints 72D-72F to undesirably bridge during manufacturing, thus requiring rework).

For example, in an application with relatively small slider pads 50A-50F and suspension pads 52A-52F and relatively small spacing between slider pads 50A-50F and suspension pads 52A-52F, a relatively large size for solder ball 82 can be selected to increase strength of solder joints 72D-72F (shown in FIG. 2). Using a relatively large solder ball 82 can, however, increase possibility of bridging between adjacent pads. In order to combat potential bridging, a recessed channel shape suitable for large quantities of solder (such as recessed channels 360A, 560A, or 660A) can be selected in order to spread solder over a greater portion of bonding surfaces 62A and 70A (shown in FIG. 2), to corral solder to centers of slider pads 50A-50F and suspension pads 52A-52F, or to do both.

Alternatively, if a relatively small solder ball 82 is selected, solder ball 82 may not contain a sufficient quantity of solder to cover large portions of bonding surfaces 62A and 70A and still make a connection. In such applications, a recessed channel shape suitable for small quantities of solder (such as recessed channels 60A or 460A) can be selected in order to direct solder flow near first edges 56A and 64A (shown in FIG. 2). This positions solder joints 72D-72F (shown in FIG. 2) near the corner intersection between slider pad 50A and suspension pad 52A for a small yet still relatively strong solder joint. In other embodiments, recessed channel shape can be guided by other factors and design requirements.

Figure 5:
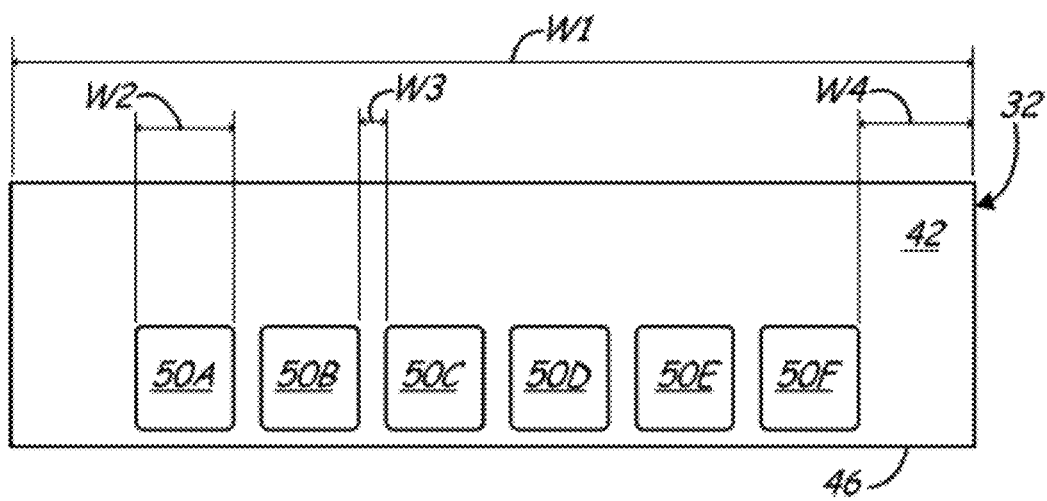
FIG. 5 is an end elevation view of the slider of FIG. 2, showing measurement distances.

FIG. 5 is an end elevation view of slider 32, showing measurement distances. In one embodiment, trailing edge 42 of slider 32 can have a width W1 of about 770 microns. Slider pads 50A-50F can have a width W2 of about 80 microns. Such slider pads 50A-50F can be spaced from each other with a width W3 of about 50 microns and still fit on trailing edge 42. Using recessed channels, such as those described above, allows width W3 to be reduced to about 40 microns, 30 microns, or even 20 microns without bridging solder joints 72D-72F (shown in FIG. 2). Reducing width W3 increases space at outside edges of slider pads 50A and 50F up to width W4 of about 95 microns. Such a reduction allows for a reduction of width W1 of slider 32 or an increase in the number of slider pads on trailing edge 42. Width W2 of slider pads 50A-50F can also be reduced to about 60 microns or even 40 microns to allow a further reduction of width W1 of slider 32 or a further increase in the number of slider pads on trailing edge 42.

Figure 6A:
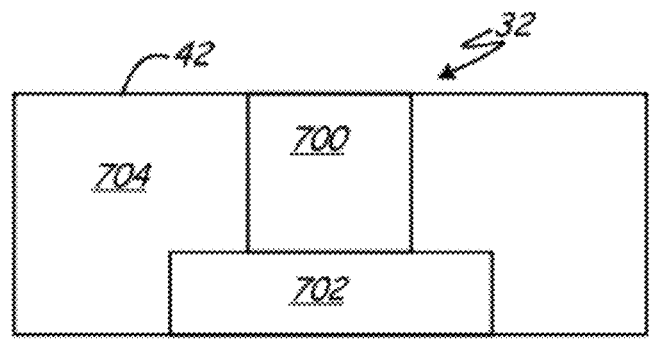
FIGS. 6A-6D are schematic sectional views of steps for forming a bond pad with recessed channels.
Figure 6B:
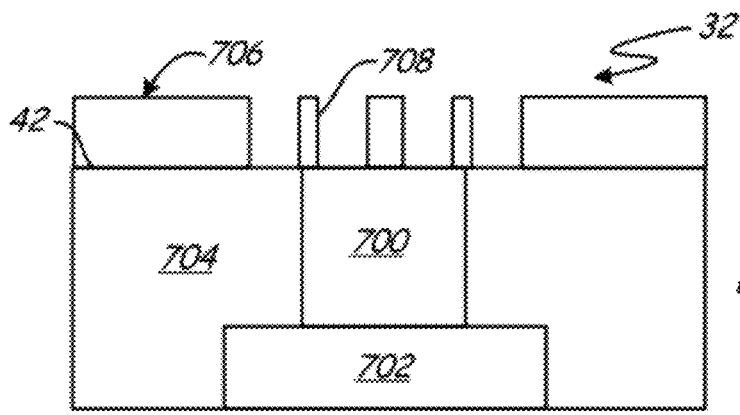
Figure 6C:
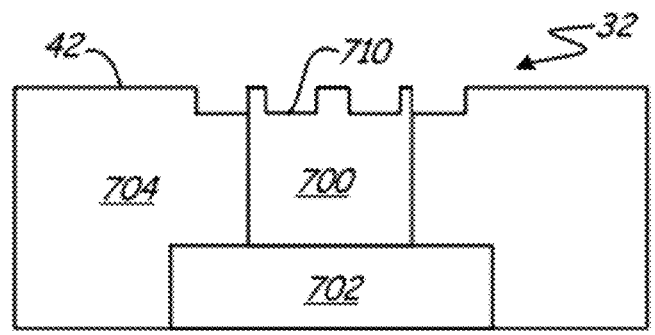
Figure 6D:
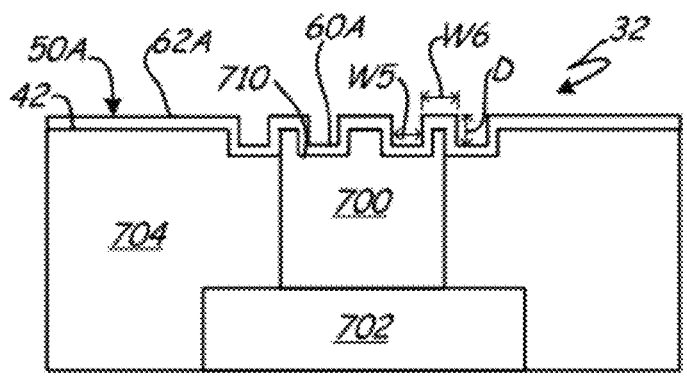

FIGS. 6A-6D are schematic sectional views, taken along line 6-6 of FIG. 4E, of steps for a method of manufacturing slider pad 50A with recessed channels 60A. FIGS. 6A-6C are views of slider pad 50A along line 6-6 in various stages of completion. FIG. 6D shows slider pad 50A along line 6-6 when manufacturing is complete.

FIG. 6A illustrates a sectional view of slider 32 during a first step of manufacture. Slider 32 has electrically conductive stud 700 positioned at trailing edge 42 of slider 32 and extending from transducer pad 702. Transducing pad 702 is electrically connected to transducing head 48 (shown in FIG. 2). Stud 700 and transducer pad 702 are surrounded by alumina layer 704. The surface of trailing edge 42 is planarized so that a surface of alumina layer 704 is flush with a surface of stud 700.

FIG. 6B illustrates a sectional view of slider 32 during a second step of manufacture. Photoresist layer 706 is patterned on trailing edge 42 at stud 700. Photoresist layer 706 has holes 708 shaped substantially similar to that desired for recessed channels 60A (shown in FIG. 2) but slightly wider. Holes 708 are positioned directly above both of stud 700 and alumina layer 704.

FIG. 6C illustrates a sectional view of slider 32 during a third step of manufacture. Ion milling is performed to trailing edge 42 with photoresist layer 706 to produce first recessed channels 710 in the shape of holes 708. Photoresist layer 706 is then stripped off trailing edge 42.

FIG. 6D illustrates a sectional view of slider 32 during a fourth step of manufacture. A layer of electrically conductive material is deposited on trailing edge 42 and in first recessed channels 710 to form bond pad 50A and define recessed channels 60A. Recessed channels 60A are the final recessed channels produced by the method. Bond pad 50A can be a thin layer of electrically conductive material such as gold. In the illustrated embodiment, recessed channels 60A have depth D of between about 2 and about 2.5 microns and have width W5 between about 4 and about 5 microns. Width W6 of portions of bond pad 50A between recessed channels 60A is also about 5 microns. In other embodiments, widths W5 and W6 as well as depth D can vary, thus varying a surface area for bonding surface 62A. Bonding surface 62A can have a surface area that is between about 10% and about 40% greater than an external dimensional area of bond pad 50A.

It will be recognized that the present invention provides numerous benefits and advantages. For example, recessed channels allow for control of solder flow during the bonding process in order to position solder on desired portions of slider and suspension pads. Such flow control allows for greater bond strength and a reduced chance of bridging to adjacent pads. Greater bond strength increases a HDD's ability to withstand shock, such as from dropping the HDD to the ground. Recessed channels also have the effect of increasing an effective solder bond surface area on slider and suspension pads. Increasing bond surface area can also increase solder bond strength. All of these advantages make it possible to reduce the size of slider and suspension pads as well as reducing spacing between pads. This ultimately allows for use of sliders with a reduced form factor. This also allows for an increase in the number of slider pads on a slider.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, size, shape, quantity, and position of pads can be varied from those illustrated on slider 32 so long as the pads have a recessed channel for directing solder flow. Additionally, the methods of manufacture and assembly illustrated with respect to FIGS. 3 and 6A-6D can be modified or even replaced with other methods suitable for forming bond pads with recessed channels.

The invention claimed is:

1. A slider comprising:
   a slider body; and
   a first bond pad positioned on the slider body and having a bonding surface with a recessed channel for directing solder flow, the recessed channel entirely surrounded by one or more outer edges, the one or more outer edges defined by the first bond pad, the recessed channel being defined by a plurality of divisions therein for directing the solder flow within the channel.

2. The slider of claim 1, and further comprising: a second bond pad positioned on the slider body adjacent the first bond pad, wherein the recessed channel directs solder flow away from the second bond pad.

3. The slider of claim 1, wherein the first bond pad has first and second opposing edges and wherein the recessed channel directs solder flow toward both the first and second edges with a greater quantity of solder directed nearer one of the first and second edges than the other of the first and second edges.

4. The slider of claim 1, wherein the bonding surface has an area between about 10% and about 40% greater than an exterior dimensional area of the first bond pad.

5. The slider of claim 1, wherein the recessed channel has a shape that is asymmetrical about a first centerline axis extending across the first bond pad, wherein the first centerline axis is parallel to an air bearing surface of the slider body.

6. The slider of claim 5, wherein the recessed channel has a teardrop shape, wherein the teardrop shape widens away from the bearing surface, with a greater portion of the teardrop shape defined in the slider body surface on a side of first centerline axis away from the bearing surface.

7. The slider of claim 5, wherein the recessed channel has a kite shape, wherein the kite shape widens away from the bearing surface, with a greater portion of the kite shape defined in the slider body surface on a side of first centerline axis away from the bearing surface.

8. The slider of claim 5, wherein a portion of the recessed channel is substantially perpendicular to the first centerline axis.

9. The slider of claim 5, wherein the recessed channel is substantially symmetric about a second centerline axis extending across the first bond pad, wherein the second centerline axis is perpendicular to the first centerline axis.

10. An assembly comprising:
    a suspension assembly comprising:
       a suspension mounting surface; and
       a suspension pad on the suspension mounting surface;
    a slider positioned adjacent the suspension mounting surface, with a slider pad aligned with the suspension pad;
    a recessed channel in at least one of the slider pad or the suspension pad, the recessed channel entirely surrounded by one or more outer edges, the one or more outer edges defined by the at least one of the slider pad or the suspension pad, the recessed channel being defined by a plurality of divisions therein for directing solder flow within the channel; and
    a solder joint formed between the suspension pad and the slider pad and extending into the recessed channel.

11. The slider of claim 10, wherein the slider pad is substantially perpendicular to the suspension pad, and wherein the recessed channel is in the slider pad with a shape that is asymmetrical about a centerline axis extending across the slider pad, wherein the first centerline axis is parallel to the suspension pad.

12. The slider of claim 10, wherein the slider has an air bearing surface, wherein the slider pad has a first edge nearest the suspension and a second edge nearest the air bearing surface, and wherein the recessed channel is positioned on the slider pad with a greater portion of the recessed channel nearer the first edge than the second edge.

13. The slider of claim 12, wherein a greater quantity of solder from the solder joint is directed in the recessed channel toward the first edge.

* * * * *